United States Patent
Trachewsky et al.

(10) Patent No.: US 7,177,662 B2
(45) Date of Patent: Feb. 13, 2007

(54) MULTIMODE WIRELESS COMMUNICATION DEVICE

(75) Inventors: Jason A. Trachewsky, Menlo Park, CA (US); Alan Corry, Santa Clara, CA (US); Venkat Kodavati, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 406 days.

(21) Appl. No.: 10/817,541

(22) Filed: Apr. 2, 2004

(65) Prior Publication Data

US 2005/0227728 A1 Oct. 13, 2005

(51) Int. Cl.
*H04M 1/00* (2006.01)

(52) U.S. Cl. ............. 455/552.1; 455/78; 455/313; 455/84

(58) Field of Classification Search ........... 455/552.1, 455/553.1, 78, 142, 93, 118, 84, 313, 334, 455/337, 277.1, 132, 133, 140
See application file for complete search history.

(56) References Cited

U.S. PATENT DOCUMENTS

| | | | | |
|---|---|---|---|---|
| 6,115,585 | A * | 9/2000 | Matero et al. ............ | 455/78 |
| 6,127,884 | A * | 10/2000 | Rishi ....................... | 455/142 |
| 6,728,517 | B2 * | 4/2004 | Sugar et al. ............ | 455/552.1 |
| 6,801,761 | B2 * | 10/2004 | Khorram .................... | 455/313 |
| 7,057,472 | B2 * | 6/2006 | Fukamachi et al. ......... | 455/118 |
| 2003/0045249 | A1 * | 3/2003 | Nielsen ...................... | 455/118 |
| 2003/0078011 | A1 * | 4/2003 | Cheng et al. ................ | 455/73 |
| 2003/0203743 | A1 * | 10/2003 | Sugar et al. ................ | 455/118 |
| 2004/0097250 | A1 * | 5/2004 | Gunzelmann et al. ........ | 455/93 |
| 2004/0192219 | A1 * | 9/2004 | Malone et al. ................ | 455/73 |
| 2004/0216003 | A1 * | 10/2004 | Floyd et al. ............. | 455/552.1 |
| 2005/0136879 | A1 * | 6/2005 | Khorram .................... | 455/333 |
| 2005/0181752 | A1 * | 8/2005 | Sahota .................... | 455/552.1 |
| 2005/0227631 | A1 * | 10/2005 | Robinett ..................... | 455/84 |
| 2005/0245199 | A1 * | 11/2005 | Batra et al. .................. | 455/73 |
| 2006/0084469 | A1 * | 4/2006 | Malone et al. ........... | 455/552.1 |

* cited by examiner

*Primary Examiner*—Lana Le
(74) *Attorney, Agent, or Firm*—Garlick Harrison & Markison; Timothy W. Markison; Bruce E. Stuckman

(57) ABSTRACT

A multimode wireless communication includes a digital baseband processing module, an analog to digital converter module, a digital to analog converter module, a first radio section, and a second radio section. The digital baseband processing module is operably coupled to convert outbound data into outbound digital baseband signals and to convert inbound digital baseband signals into inbound data. The analog to digital converter module is operably coupled to convert inbound analog baseband signals into the inbound digital baseband signals. The digital to analog converter module is operably coupled to convert the outbound digital baseband signals into outbound analog baseband signals. The first radio section is operably coupled to convert the outbound analog baseband signals into first outbound radio frequency (RF) signals and to convert first inbound RF signals into the inbound analog baseband signals when the wireless communication device is in a first mode of operation. The second radio section is operably coupled to convert the outbound analog baseband signals into second outbound RF signals and to convert second inbound RF signals into the inbound analog baseband signals when the wireless communication device is in a second mode of operation.

26 Claims, 5 Drawing Sheets diversity antenna arrangement wireless communication device 10

*diversity antenna arrangement* wireless communication device 70 wireless communication device 90

1st or 2nd radio section 18 or 20

MULTIMODE WIRELESS COMMUNICATION DEVICE

BACKGROUND OF THE INVENTION

1. Technical Field of the Invention

This invention relates generally to wireless communication systems and more particularly to wireless communication devices that operate in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in transceiver (i.e., receiver and transmitter) or is coupled to an associated transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Such a transceiver enables a wireless communication device to function in a particular wireless communication system. For example, if the transceiver is designed to function in an IEEE 802.11a compliant wireless communication system, the transceiver is only operable in such a system and cannot be used in a another wireless communication system (e.g., an IEEE 802.11b or g compliant wireless communication system). With the advent of multiple wireless communication standards (e.g., IEEE 802.11a, IEEE 802.11b, IEEE 802.11g, etc.) it would be advantageous if a wireless communication device could operation in multiple wireless communication systems with minimal added complexity to the one wireless communication system transceiver structure.

Therefore a need exists for a multiple mode wireless communication device that is operable in multiple standard compliant wireless communication systems.

BRIEF SUMMARY OF THE INVENTION

The multimode wireless communication device of the present invention substantially meets these needs and others. In one embodiment, a multimode wireless communication includes a digital baseband processing module, an analog to digital converter module, a digital to analog converter module, a first radio section, and a second radio section. The digital baseband processing module is operably coupled to convert outbound data into outbound digital baseband signals and to convert inbound digital baseband signals into inbound data. The analog to digital converter module is operably coupled to convert inbound analog baseband signals into the inbound digital baseband signals. The digital to analog converter module is operably coupled to convert the outbound digital baseband signals into outbound analog baseband signals. The first radio section is operably coupled to convert the outbound analog baseband signals into first outbound radio frequency (RF) signals and to convert first inbound RF signals into the inbound analog baseband signals when the wireless communication device is in a first mode of operation. The second radio section is operably coupled to convert the outbound analog baseband signals into second outbound RF signals and to convert second inbound RF signals into the inbound analog baseband signals when the wireless communication device is in a second mode of operation. Such a multiple mode wireless communication device is operable in multiple standard compliant wireless communication systems.

In another embodiment, a multimode wireless communication device includes a first integrated circuit and a second integrated circuit. The first integrated circuit includes a digital baseband processing module, an analog to digital converter module, a digital to analog converter module, and a first radio section. The second integrated circuit includes a second radio section. The digital baseband processing module is operably coupled to convert outbound data into outbound digital baseband signals and to convert inbound digital baseband signals into inbound data. The analog to digital converter module is operably coupled to convert inbound analog baseband signals into the inbound digital baseband signals. The digital to analog converter module is operably coupled to convert the outbound digital baseband signals into outbound analog baseband signals. The first radio section is operably coupled to convert the outbound analog baseband signals into first outbound radio frequency (RF) signals and to convert first inbound RF signals into the inbound analog baseband signals when the wireless communication device is in a first mode of operation. The second radio section is operably coupled to convert the outbound analog baseband signals into second outbound RF signals and to convert second inbound RF signals into the inbound analog baseband signals when the wireless communication device is in a second mode of operation. Such a multiple mode wireless communication device is operable in multiple standard compliant wireless communication systems.

In yet another embodiment, a multimode wireless communication device includes a first integrated circuit, a second integrated circuit, and a third integrated circuit. The first integrated circuit includes a digital baseband processing module, an analog to digital converter module, and a digital to analog converter module. The second integrated circuit includes a first radio section. The third integrated circuit includes a second radio section. The digital baseband processing module is operably coupled to convert outbound data into outbound digital baseband signals and to convert inbound digital baseband signals into inbound data. The analog to digital converter module is operably coupled to convert inbound analog baseband signals into the inbound digital baseband signals. The digital to analog converter module is operably coupled to convert the outbound digital baseband signals into outbound analog baseband signals. The first radio section is operably coupled to convert the outbound analog baseband signals into first outbound radio frequency (RF) signals and to convert first inbound RF signals into the inbound analog baseband signals when the wireless communication device is in a first mode of operation. The second radio section is operably coupled to convert the outbound analog baseband signals into second outbound RF signals and to convert second inbound RF signals into the inbound analog baseband signals when the wireless communication device is in a second mode of operation. Such a multiple mode wireless communication device is operable in multiple standard compliant wireless communication systems.

DETAILED DESCRIPTION OF THE INVENTION

Figure 1:
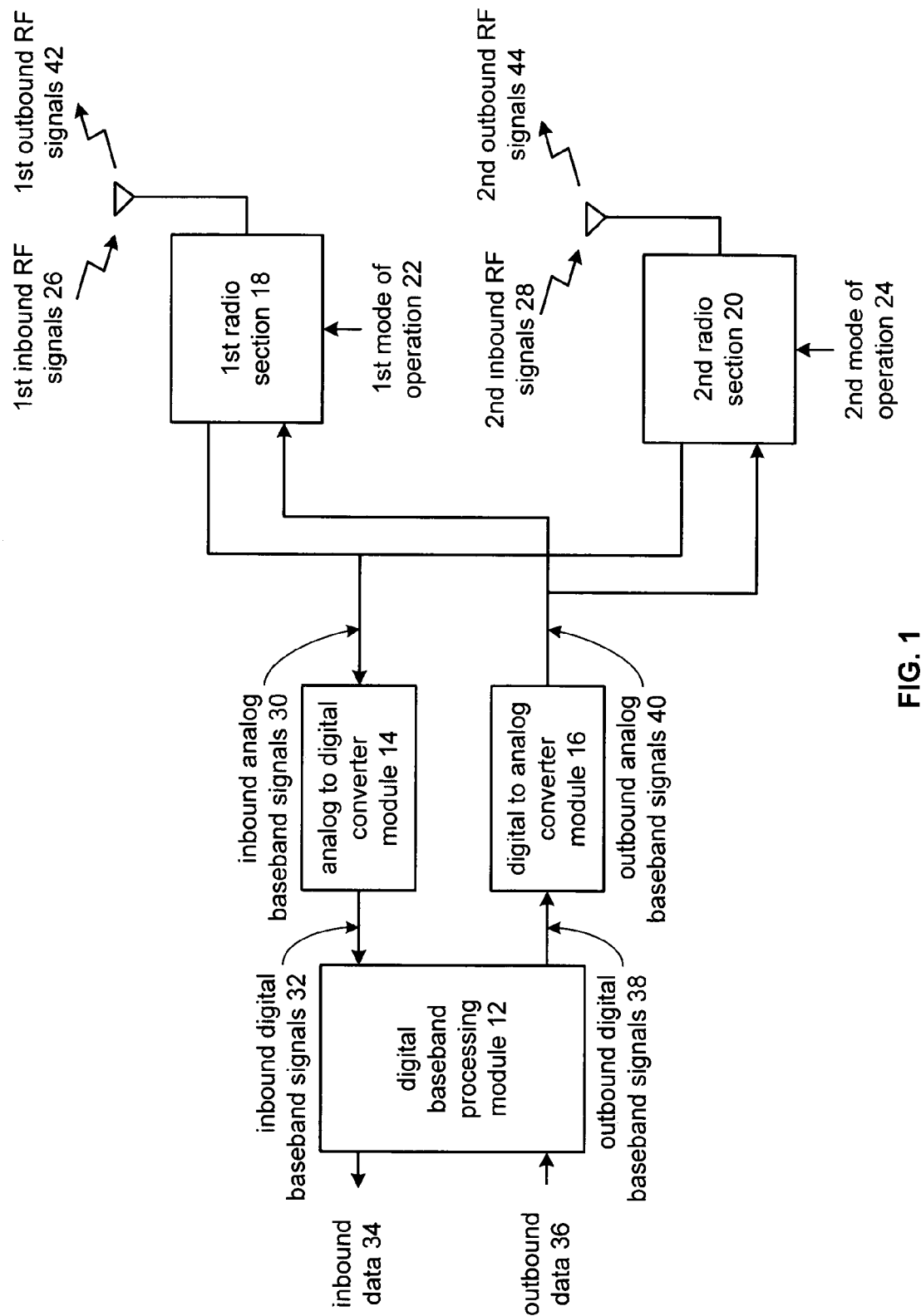
FIG. 1 is a schematic block diagram of a wireless communication device in accordance with the present invention.

FIG. 1 is a schematic block diagram of a wireless communication device 10 that includes a digital baseband processing module 12, an analog-to-digital converter module 14, a digital-to-analog converter module 16, a $1^{st}$ radio section 18, and a $2^{nd}$ radio section 20. The wireless communication device 10 may be operable in multiple standardized wireless communication systems including, but not limited to, IEEE 802.11a systems, IEEE 802.11b systems, and IEEE 802.11g systems.

The digital baseband processing module 12 includes a processing module and associated memory. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 32 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 34 stores, and the processing module 32 executes, operational instructions corresponding to at least some of the steps and/or functions illustrated in FIGS. 1–4.

The digital baseband processing module 12 is operably coupled to convert outbound data 36, which may correspond to raw data produced by a host device coupled to the wireless communication device 10 and/or raw data generated by the wireless communication device 10 for transmission, into outbound digital baseband signals 38. The digital baseband processing module 12 may convert the outbound data 36 into the outbound digital baseband signals 38 by performing one or more of forward error correction coding, interleaving, mapping, performing an inverse fast Fourier transform, adding a guard interval, and/or symbol wave shaping.

The digital baseband processing module 12 is also operably coupled to convert inbound digital baseband signals 32 into inbound data 34. Such processing may include performing guard interval removal, fast Fourier transform, demapping, deinterleaving, and/or forward error decoding. Such processing of inbound and outbound data by the digital baseband processing module may be in accordance with one or more of, but not limited to, the IEEE 802.11a standard, IEEE 802.11b standard and/or the IEEE 802.11g standard.

The digital-to-analog converter module 16 is operably coupled to convert the outbound digital baseband signals 38 into outbound analog baseband signals 40. The $1^{st}$ radio section 18 and $2^{nd}$ radio section 20 both receive the outbound analog baseband signals 40. In a $1^{st}$ mode of operation 22 of the wireless communication device, the $1^{st}$ radio section 18 is enabled to convert the outbound analog baseband signals 40 into outbound radio frequency signals 42. In this mode, the $2^{nd}$ radio section 20 is inactive. In a $2^{nd}$ mode of operation 24 of the wireless communication device, the $2^{nd}$ radio section 20 is enabled and the $1^{st}$ radio section 18 is disabled. In this mode, the $2^{nd}$ radio section 20 converts the outbound analog baseband signals 40 into the outbound RF signals 44. Note that in one embodiment, the $1^{st}$ radio section 18 may convert the outbound analog baseband signals 40 into the outbound radio frequency signals 42, wherein the outbound radio frequency signals 42 have a carrier frequency of approximately 2.4 GHz. Further note that the $2^{nd}$ radio section 20 may convert the outbound analog baseband signals 40 into the outbound radio frequency signals 44, where the outbound radio frequency signal 44 have a carrier frequency of approximately 5.2 to 5.7 GHz.

When the wireless communication device is in the $1^{st}$ mode of operation 22, the $1^{st}$ radio section 18 may receive inbound radio frequency signals 26. In this instance, the $1^{st}$ radio section 18 converts the inbound radio frequency signals 26 into inbound analog baseband signals 30. The analog-to-digital converter module 14 converts the inbound analog baseband signals 30 into the inbound digital baseband signals 32. The digital baseband processing module 12 converts the inbound digital baseband signals 32 into the inbound data 34 in accordance with the $1^{st}$ mode of operation 22, which may correspond to IEEE 802.11a, IEEE 802.11b, or IEEE 802.11g.

When the wireless communication device is in a $2^{nd}$ mode of operation 24, the $2^{nd}$ radio section 20 may receive inbound radio frequency signals 28 and convert them into the inbound analog baseband signals 30. The analog-to-digital converter module 14 converts the inbound analog baseband signals 30 into the inbound digital baseband signals 32. The digital baseband processing module 12, in accordance with the $2^{nd}$ mode of operation 24, converts the inbound digital baseband signals 32 into the inbound data 34.

Figure 2:
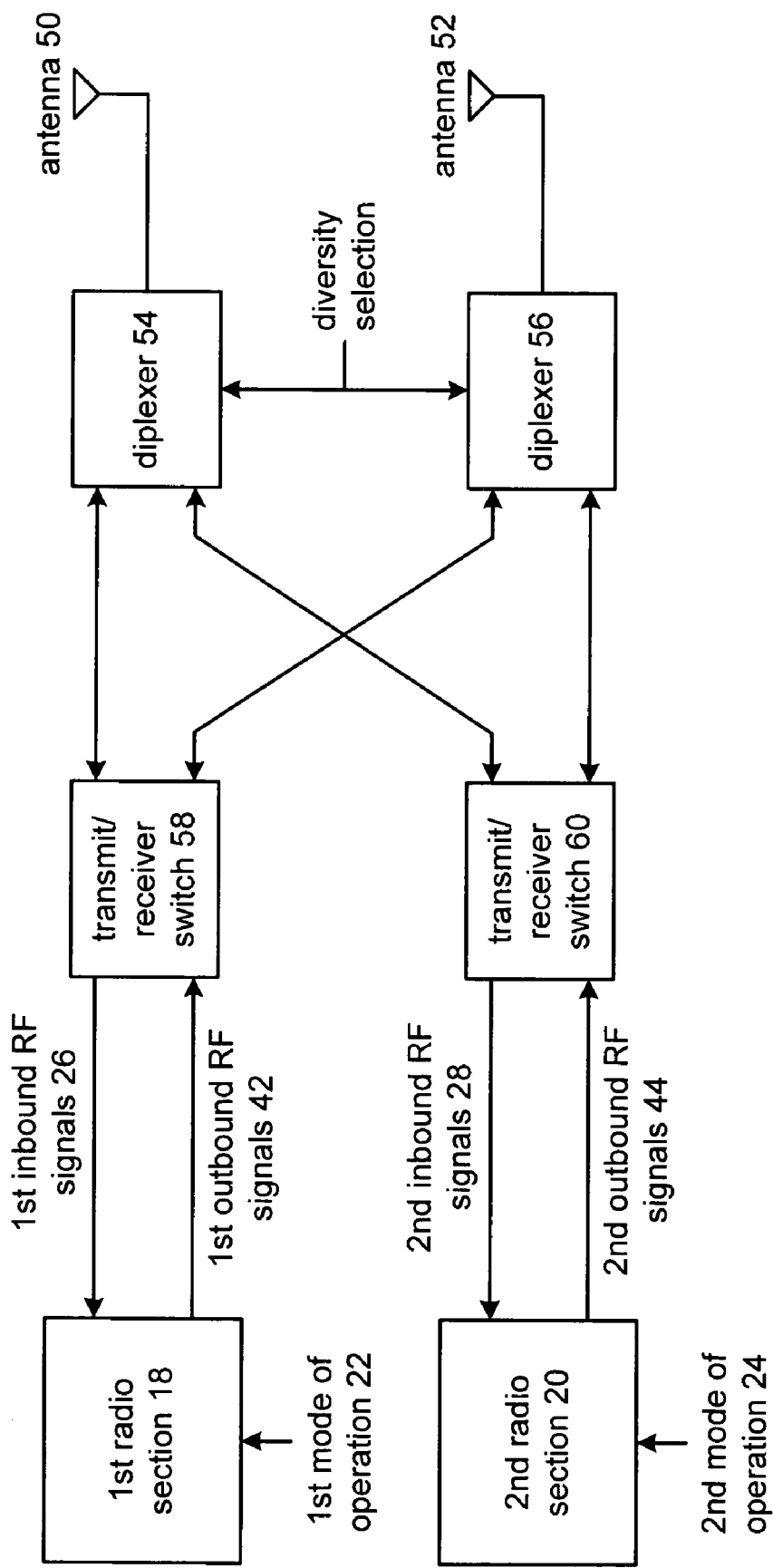
FIG. 2 is a schematic block diagram of a diversity antenna arrangement that may be used by a wireless communication device in accordance with the present invention.

FIG. 2 is a schematic block diagram of a diversity antenna arrangement that may be utilized by the wireless communication device 10 to transceive radio frequency signals. In this embodiment, the diversity antenna arrangement includes two antennas 50 and 52, two diplexers 54 and 56, and two transmit/receive switches 58 and 60. As shown, diplexer 54 is coupled to antenna 50 and diplexer 56 is coupled to antenna 52. In a diversity application, either antenna 50 is enabled or antenna 52 is enabled via the diversity selection, which also enables the corresponding diplexer 54 or 56. For instance, if antenna 50 is selected, diplexer 54 is activated while diplexer 56 is deactivated.

Each transmit/receive switch 58 and 60 is operably coupled to both diplexers 54 and 56. As is further shown, transmit/receive switch 58 is coupled to the $1^{st}$ radio section 18 while transmit/receive switch 60 is coupled to the $2^{nd}$ radio section 20. As coupled, either the $1^{st}$ or $2^{nd}$ radio section 18 or 20 may be activated to transceive radio frequency signals via either antenna 50 or 52. For example, if the $1^{st}$ radio section 18 is activated during the $1^{st}$ mode of operation 22 and antenna 52 has been selected, diplexer 56 is activated and transmit/receive switch 58 provides the coupling between the $1^{st}$ radio section 18 and the diplexer 56. Alternatively, if the $2^{nd}$ radio section 20 is activated when the wireless communication device is in the $2^{nd}$ mode of operation 24, and antenna 52 is selected, the transmit/receive switch 60 provides the coupling between diplexer 56 and the $2^{nd}$ radio section 20.

As one of average skill in the art will appreciate, the transmit/receive switch 58 and 60 may be implemented on-chip with the corresponding radio sections 18 or 20 or off-chip with respect to the radio sections 18 or 20. Further, diplexers 54 and 56 may be implemented on-chip with the transmit/receive switch 58 and/or off-chip with respect to the transmit/receive switch 58 or 60.

Figure 3:
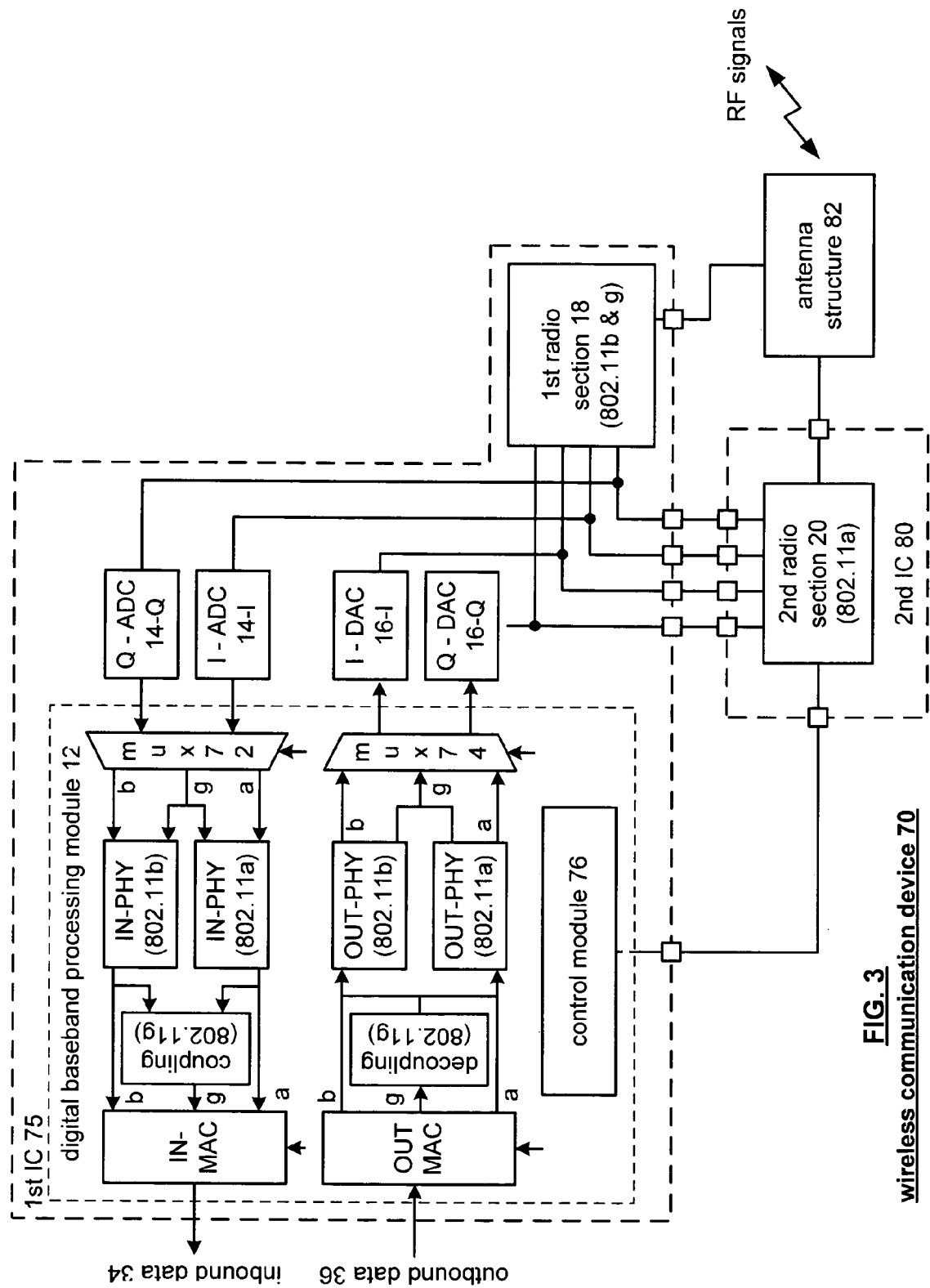
FIG. 3 is a schematic block diagram of an alternate wireless communication device in accordance with the present invention.

FIG. 3 is a schematic block diagram of a wireless communication device 70 that supports multiple wireless communication standards including, but not limited to, IEEE 802.11a, IEEE 802.11b and IEEE 802.11g. In this embodiment, the digital baseband processing module 12, the digital-to-analog converter module 16, the analog-to-digital converter module 14 and the $1^{st}$ radio section 18 are implemented on a single integrated circuit 75. The $2^{nd}$ radio section 20 is implemented on a $2^{nd}$ integrated circuit 80. As is further shown, both the $1^{st}$ and $2^{nd}$ radio sections 18 and 20 are operably coupled to an antenna structure 82 which may be implemented as illustrated in FIG. 2 or may include a single transmit/receive switch coupled to a single antenna.

As is further shown, the digital-to-analog converter module 16 includes an in-phase (I) digital-to-analog converter 16-I, and a quadrature (Q) digital-to-analog converter 16-Q. Similarly, the analog-to-digital converter module 14 includes an in-phase analog-to-digital converter 14-I and a quadrature analog-to-digital converter 14-Q.

The digital baseband processing module 12 includes a control module 76, an inbound data media specific access control protocol layer (IN-MAC), a coupling module, an inbound physical layer (IN-PHY) for IEEE 802.11b, an inbound physical layer (IN-PHY) for IEEE 802.11a, a $1^{st}$ multiplexer 72, a $2^{nd}$ multiplexer 74, an outbound physical layer (OUT-PHY) for IEEE 802.11b, an outbound physical layer (OUT-PHY) for IEEE 802.11a, a decoupling module, and an outbound media specific access control protocol module (OUT-MAC). As configured, the digital baseband processing module 12 may convert the outbound data 36 into the outbound digital baseband signals 38 in accordance with IEEE 802.11a, IEEE 802.11b or IEEE 802.11g under the control of control module 76. When the digital baseband processing module 12 is to perform in accordance with IEEE 802.11a, the control module 76 enables the outbound MAC layer to convert the outbound data 36 into outbound symbols in accordance with IEEE 802.11a and provide, via path "a", the symbols to the outbound physical layer for IEEE 802.11a. The outbound physical layer IEEE 802.11a converts the symbols into the outbound digital baseband signals 38, which via multiplexer 74, are provided to the in-phase and quadrature digital-to-analog converters 16-Q and 16-I.

When the digital baseband processing module 12 is to operate in accordance with IEEE 802.11b, the control module 76 enables the outbound MAC layer to convert the outbound data 36 into outbound symbols "b". The outbound physical layer for IEEE 802.11b converts the outbound symbols into the outbound digital baseband signals 38 which, via multiplexer 74 are provided as in-phase and quadrature signals to the digital-to-analog converters 16-Q and 16-I.

When the digital baseband processing module 12 is configured to support IEEE 802.11g, the control module 76 enables the outbound MAC layer to convert the outbound data 36 into symbols "g". The decoupling module decouples the symbols and provides the decoupled symbols to the outbound physical layer for IEEE 802.11b and to the outbound physical layer for IEEE 802.11a. The outputs of these physical layers are combined to produce the IEEE 802.11g compliant outbound digital baseband signals 38 which, via multiplexer 74, are provided to the in-phase and quadrature digital-to-analog converters 16-I and 16-Q.

Depending on the mode of operation, the control module 76 enables the $1^{st}$ radio section 18 and disables the $2^{nd}$ radio section 20 such that the $1^{st}$ radio section for IEEE 802.11b or IEEE 802.11g operation is enabled to convert the outbound analog baseband signals 40 into the outbound RF signals 42. Alternatively, if the mode of operation corresponds to IEEE 802.11a applications, the control module 76, via the interface to the $2^{nd}$ integrated circuit 80, enables the $2^{nd}$ radio section 20 and disables the $1^{st}$ radio section 18. As such, the $2^{nd}$ radio section 20 may convert the outbound analog baseband signals 40 into the outbound radio frequency signals 44.

When the wireless communication device is in an IEEE 802.11b mode, RF signals are received via the antenna structure 82 and the $1^{st}$ radio section 18. The inbound radio frequency signals are converted into inbound analog baseband signals 30 and provided to the in-phase and quadrature-analog-to-digital converters 14-I and 14-Q. The in-phase and quadrature analog-to-digital converters convert the inbound analog baseband signals 30 into inbound digital baseband signals 32.

In this mode, multiplexer 72 is enabled, via control module 76, to provide the inbound in-phase and quadrature digital signals to the inbound physical layer for IEEE 802.11b applications. The inbound physical layer for IEEE 802.11b converts the inbound digital signals into inbound symbols that are provided to the inbound MAC layer. The inbound MAC layer converts the inbound symbols "b" into the inbound data 34.

When the wireless communication device 70 is in IEEE 802.11g operation, the $1^{st}$ radio section 18 is activated and the $2^{nd}$ radio section 20 is deactivated. As such, the $1^{st}$ radio section 18 receives the inbound RF signals and converts them into inbound analog baseband signals. The digital-to-analog converters convert the in-phase and quadrature components of the inbound analog baseband signals into corresponding digital baseband signals. In this mode, multiplexer 72 provides the inbound digital baseband signals to both the inbound physical layers for IEEE 802.11b and IEEE 802.11a. The outputs of the inbound physical layers are provided to a coupling module, which combines the symbols produced by each physical layer into the symbols for IEEE 802.11g. The inbound MAC layer converts the symbols "g" into the inbound data 34.

When the wireless communication device 70 is in an IEEE 802.11a mode, the $1^{st}$ radio section 18 is deactivated and the $2^{nd}$ radio section 20 is activated. In this instance, the $2^{nd}$ radio section 20 receives inbound radio frequency signals and converts them into inbound analog baseband signals that are provided to the in-phase and quadrature digital-to-analog converters 16-I and 16-Q. The resulting digital in-phase and quadrature baseband signals are provided via multiplexer 72 to the inbound physical layer for IEEE 802.11a. The inbound physical layer produces inbound symbols in accordance to IEEE 802.11a which are provided to the inbound MAC layer. The inbound MAC layer converts the inbound symbols into the inbound data 34.

Figure 4:
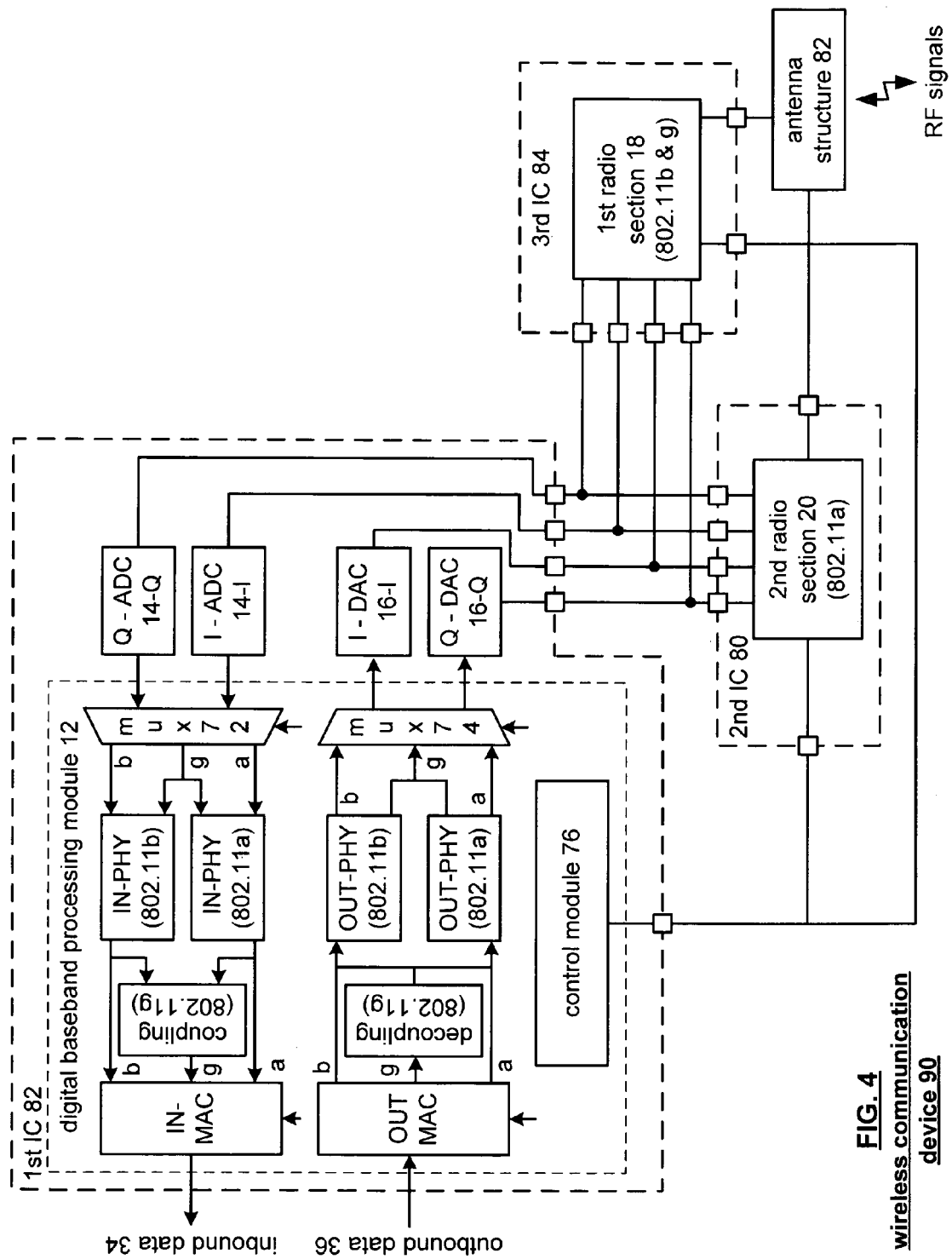
FIG. 4 is a schematic block diagram of another embodiment of a wireless communication device in accordance with the present invention.

FIG. 4 is a schematic block diagram of another wireless communication device 90 that includes 3 integrated circuits 82, 80, and 84. In this embodiment, the $1^{st}$ integrated circuit 82 includes the digital baseband processing module 12, the in-phase and quadrature digital-to-analog converters 16-I and 16-Q, and the in-phase and quadrature analog-to-digital converters 14-I and 14-Q. The $2^{nd}$ integrated circuit includes the $2^{nd}$ radio section 18 and the $3^{rd}$ integrated circuit 84 includes the $1^{st}$ radio section 18. In this embodiment, control module 76 of the $1^{st}$ integrated circuit is coupled via a control interface to both integrated circuits 80 and 84. The control interface may be a 4-wire joint test action group (JTAG) interface. The processing of inbound data in accordance with IEEE 802.11a mode of operation, IEEE 802.11b mode of operation and IEEE 802.11g mode of operation is conceptually the same as described with reference to FIG. 3.

In this embodiment, the control module 76 establishes the particular mode of operation via the control interface with the $2^{nd}$ and $3^{rd}$ integrated circuits 80 and 84. For instance, when the wireless communication device 90 is in an IEEE 802.11a mode of operation, the control module 76 enables the $2^{nd}$ radio section 20 and disables the $1^{st}$ radio section 18. In addition, the 802.11b processing core within the digital baseband processing module 12 is disabled (i.e., no clock signals). To disable the $1^{st}$ radio section, the 4-wire interface coupled thereto is inactive, which may be achieved by setting all the signals thereon to zeros. In addition, the 802.11g physical layer mode of operation is placed in an 802.11a mode. Still further, the clock generator of the $1^{st}$ integrated circuit 82 provides clocking signals to the $2^{nd}$ integrated circuit 80.

To place the $1^{st}$ radio section 18 in a disabled mode, the transmit power-up input, the receive power-up input, the synthesizer power-up input, the antenna select input and the transmit/receive switch selection inputs are all set to zero. This may be done by writing to the radio frequency overrides of the $1^{st}$ radio section 18 prior to entering the IEEE 802.11a mode of operation. In addition, the crystal power-up input for the $1^{st}$ radio section 18 should be set to zero, which can be controlled through the general purpose input/output registers of the $1^{st}$ radio section 18.

When the wireless communication device 90 is to be placed in the IEEE 802.11g mode, the $2^{nd}$ radio section 20 is inactivated and the $1^{st}$ radio section 18 is activated. Further, the 4-wire interface with the $2^{nd}$ radio section 20 should be deactivated and the clock signals produced by the $1^{st}$ integrated circuit should be supplied to the $1^{st}$ radio section 18.

To place the $2^{nd}$ radio section 20 in an inactive state, the receive enable, transmit enable, voltage control oscillation enable, crystal enable should all be set to zero, which can be done via the 4-wire interface with integrated circuit 82. Further, the antenna select and transmit/receive select inputs of the $1^{st}$ radio section 18 should be set to zero, which may be done by writing to the radio frequency overrides prior to entering the 802.11g mode of operation. Still further, the power amplifier of the $1^{st}$ radio section 18 should be disabled, which again can be done by writing to the RF overrides prior to entering the IEEE 802.11g mode of operation.

The control module 76 also provides functionality to switch from being in one mode of operation to another. For example, when the wireless communication device is in an IEEE 802.11g mode of operation and desires to switch to IEEE 802.11a mode of operation, the control module 76 controls such a transition as follows. To achieve this transition, the control module disables the power-down of the $2^{nd}$ radio section 20. After doing this, the control module 76 writes to the "g" physical layer override controls to set the $1^{st}$ radio sections transmit power-up, receive power-up and synthesizer power-up to zero thus, beginning to turn-off the $1^{st}$ radio section. The control module 76 then waits for a period of time (e.g., a few microseconds) for the crystal oscillator of the $1^{st}$ radio section 18 to settle.

The control module then sets the 802.11a physical layer synthesis power-up override to zero for the $1^{st}$ radio section 18. The control module then sets the receive power-down receive signal strength indication power-down, VCO power-down to zero of the $2^{nd}$ radio section 20 via the 4-wire interface, which begins to enable the $2^{nd}$ radio section 20. The control module then asserts a physical layer reset and waits for a few microseconds for the reset to propagate through the digital baseband processing module 12.

The control module then disables the 802.11g mode of operation within the digital baseband processing module 12 and then waits for a few microseconds for the reset to propagate throughout the digital baseband processing module 12. The control module then couples the clock signals generated by the $1^{st}$ integrated circuit to the $2^{nd}$ radio section 20 in the $2^{nd}$ integrated circuit and then disables the clock connections with the $3^{rd}$ integrated circuit, which supports the $1^{st}$ radio section 18. After wait periods for the phase locked loop of the $1^{st}$ integrated circuit to settle and the frequency synthesizer of the $2^{nd}$ integrated circuit to settle, the control module 76 removes the reset condition of the digital baseband processing module 12 and then places it in the IEEE 802.11a mode of operation. The digital baseband processing module 12 then writes to the "a" physical layer analog override controls to disable analog overrides thereby enabling the IEEE 802.11a mode of operation.

The control module may also coordinate the switching from IEEE 802.11a mode of operation to IEEE 802.11a mode of operation to IEEE 802.11g mode of operation. In this mode transformation, the control module 76 begins by enabling the crystal oscillator of the $1^{st}$ radio section 18 on the $3^{rd}$ integrated circuit 84. The control module then powers down the transmit, receive and VCO (voltage controlled oscillator) of the $2^{nd}$ radio section 20 via the 4-wire interface and waits for the crystal oscillator of the $3^{rd}$ integrated circuit to settle. The control module then writes to the "g" physical layer override registers to remove overrides on the synthesizer power-up, which may be done by utilizing the "b" physical layer override controls and/or dedicated "g" override controls.

The control module then enables the "g" mode of operation within a digital baseband processing module 12 and adjusts the phase locked loop of the $1^{st}$ integrated circuit 82. After a wait period, the clock of the $1^{st}$ integrated circuit is coupled to the clock of the $3^{rd}$ integrated circuit and a wait period is begun for the clocks to synchronize.

The control module then writes to the "g" physical layer override registers to remove overrides on the transmit power-up and receive power-up for the "g" mode of operation. The control module then disables the $2^{nd}$ radio section 20 and writes to the "g" physical analog override controls to disable analog overrides for the "g" mode of operation which now may be commenced.

The control module further controls switching into the 802.11g mode of operation after a power-on reset. This may be done by turning on the crystal oscillator within the $3^{rd}$ integrated circuit and waiting a period of time (e.g., microseconds) for the oscillator to settle. Next, the control module asserts the physical reset and sets the "g" mode of operation to 1. The control module then selects the $3^{rd}$ integrated circuit 84 output clock for the $1^{st}$ integrated circuit clock generation phase locked loop and waits for the phase locked loop to settle. The control module then takes the physical layer out of reset and waits for a few clock cycles. The control module then sets the force_gated_clocks on to zero, which disables the clock signals to the $2^{nd}$ radio section 20. The control module then writes to the "g" physical layer override registers to remove overrides on the transmit power-up, receive power-up and synthesizer power-up for the $3^{rd}$ integrated circuit. The control module then initializes the digital baseband processing module 12 for the "g" mode of operation. The control module then sets the crystal oscillator power-down for the $2^{nd}$ radio section 20 to zero via the 4-wire interface. The control module then writes to the "g" physical layer analog override controls to disable the analog overrides thus enabling the wireless communication device 20 to operate in the IEEE 802.11g mode.

The control module further functions to switch into the IEEE 802.11a mode after a power-on reset condition. In this mode, the control module asserts physical reset, sets the "g" mode of operation to zero and sets the force_gated_clocks on to 1 and waits for Q clock cycles thus beginning the clocking circuitry within the $2^{nd}$ radio section 20. The control module 76 then selects the $2^{nd}$ integrated circuit output clocks for the $1^{st}$ integrated circuit clock generator phase locked loop. The control module then disables the crystal oscillator of the $1^{st}$ radio section 18. After a wait period for the phase locked loop of the $1^{st}$ integrated circuit to settle, the control module takes the physical layer out of reset within the $1^{st}$ integrated circuit. The control module then sets the force_gated_clocks on to zero for the $1^{st}$ radio section 18. The control module then writes to the "g" physical layer override controls to disable the transmit power-up, receive power-up and synthesizer power-up for the $3^{rd}$ integrated circuit. The control module then enables the synthesizer power-up for the "a" mode of operation and subsequently enables the receive power-up, transmit power-up, RSSI power-up and VCO power-up via the 4-wire interface for the $2^{nd}$ radio section 20. The control module then enables the digital baseband processing module 12 for IEEE 802.11a mode of operation and then writes to the "a" physical layer analog override controls to disable analog overrides such that the wireless communication device 90 is enabled for IEEE 802.11a operations.

Figure 5:
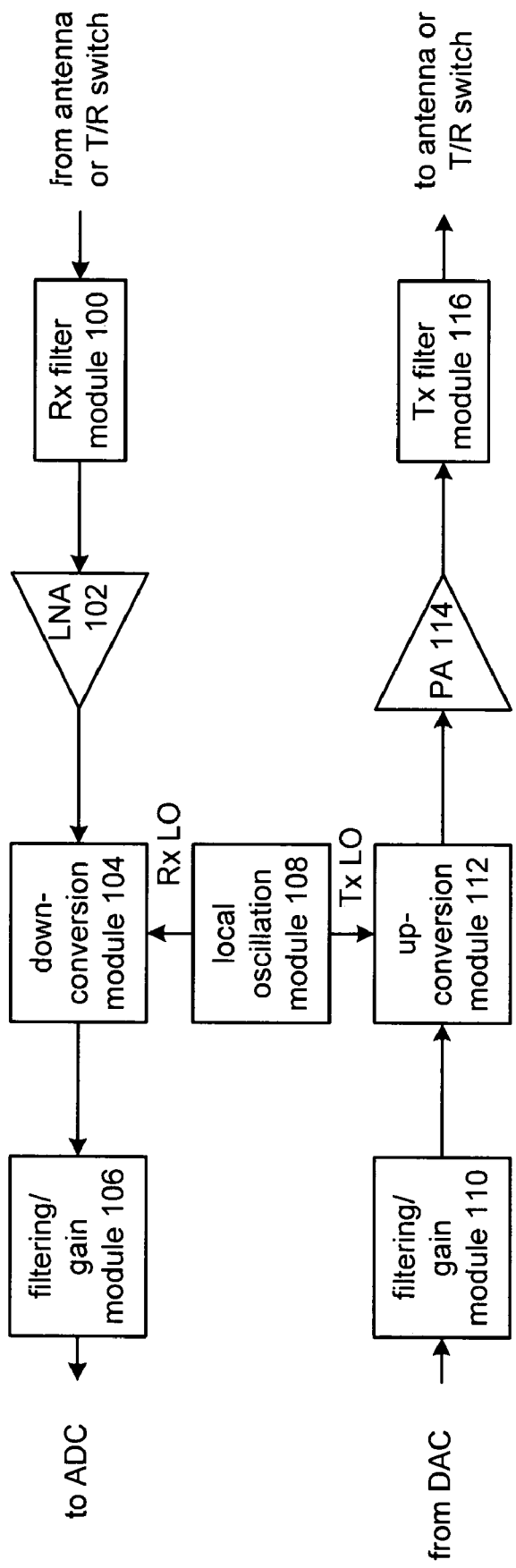
FIG. 5 is a schematic block diagram of the $1^{st}$ and/or $2^{nd}$ radio section of a wireless communication device in accordance with the present invention.

FIG. 5 is a schematic block diagram of the $1^{st}$ or $2^{nd}$ radio sections 18 or 20. As shown, each radio section 18 or 20 includes a receiver section and a transmitter section. The receiver section includes a receiver filter module 100 that receives RF signals from the antenna or from a corresponding transmit/receive switch. The receive filter module 100 bandpass filters that passes RF signals of interest to the low noise amplifier 102. The low noise amplifier 102 amplifies the signals and provides it to the down-conversion module 104. Based on a receiver local oscillation (RX LO) the down conversion module 104 converts the inbound radio frequency signals to a baseband signal which is subsequently filtered and/or gain adjusted via the filtering/gain module 106. The output of filter/gain module 106 is provided to the analog-to-digital converter.

The transmitter section includes the filter/gain module 110 that receives analog signals from the digital-to-analog converter and provides them to the up-conversion module 112. The up-conversion module 112, based on a transmit local oscillation (TX LO) converts the baseband analog signals into radio frequency signals that are amplified via power amplifier 114. The transmit filter module 116 bandpass filters the radio frequency signals from the power amplifier 114 and provides them either to an antenna or to a corresponding transmit switch.

The local oscillation module 108 produces the receive local oscillation and the transmit local oscillation based on internally generated clock signals or clock signals received from another integrated circuit.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a multimode wireless communication device that is operable in multiple wireless communication systems with minimal additional circuitry. As one of average skill in the art will appreciate, other embodiments may be derived from the teaching of the present invention without deviating from the scope of the claims.

What is claimed is:

1. A multimode wireless communication device comprises:

digital baseband processing module operably coupled to convert outbound data into outbound digital baseband signals and to convert inbound digital baseband signals into inbound data;

analog to digital converter module operably coupled to convert inbound analog baseband signals into the inbound digital baseband signals;

digital to analog converter module operably coupled to convert the outbound digital baseband signals into outbound analog baseband signals;

first radio section operably coupled to convert the outbound analog baseband signals into first outbound radio frequency (RF) signals and to convert first inbound RF signals into the inbound analog baseband signals when the wireless communication device is in a first mode of operation;

a second radio section operably coupled to convert the outbound analog baseband signals into second outbound RF signals and to convert second inbound RF signals into the inbound analog baseband signals when the wireless communication device is in a second mode of operation; and a diversity antenna arrangement, that includes a first antenna, a second antenna, a first diplexer coupled to the first antenna, and a second diplexer coupled to the second antenna, that selectively couples the first radio section to one of the first antenna and the second antenna, and that selectively couples the second radio section to one of the first antenna and the second antenna a first transmit/receive (T/R) switch operably coupled to the first and second diplexers and to the first radio section, wherein, when the wireless communication device is in the first mode of operation, the first T/R switch provides the first inbound RF signals from a first selected antenna of the first and second antennas to the first radio section and provides the first outbound RF signals from the first radio section to the first selected antenna; and a second T/R switch operably coupled to the first and second diplexers and to the second radio section, wherein, when the wireless communication device is in the second mode of operation, the second T/R switch provides the second inbound RF signals from a second selected antenna of the first and second antennas to the second radio section and provides the second outbound RF signals from the second radio section to the second selected antenna.

2. The multimode wireless communication device of claim 1, wherein the digital baseband processing module further functions to convert the outbound data into the outbound digital baseband signals and to convert the inbound digital baseband signals into the inbound data processes the inbound and outbound data in accordance with at least one of IEEE 802.11a, IEEE 802.11b, and IEEE 802.11g.

3. The multimode wireless communication device of claim 1 further comprises:

the analog to digital converter module, the digital to analog converter module, and the digital baseband processing module being in a first integrated circuit;

the first radio section being in a second integrated circuit; and the second radio section being in a third integrated circuit.

4. The multimode wireless communication device of claim 3, wherein the first integrated circuit further comprises:

a control interface operably coupled to the second and third integrated circuits, wherein the control interface carries control signals to include the first or second mode of operation.

5. The multimode wireless communication device of claim 4, wherein the control interface comprises: a 4-wire Joint Test Action Group (JTAG) interface.

6. The multimode wireless communication device of claim 3, wherein the first integrated circuit comprises:

first analog to digital integrated circuit pins coupled to the first radio section:

second analog to digital integrated circuit pins coupled to the second radio section, wherein the first analog to digital integrated circuit pins are operably coupled to the second analog to digital integrated circuit pins;

first digital to analog integrated circuit pins coupled to the first radio section; and second digital to analog integrated circuit pins coupled to the second radio section, wherein the second digital to analog integrated circuit pins are operably coupled to the first digital to analog integrated circuit pins.

7. The multimode wireless communication device of claim 3, wherein the first integrated circuit comprises:

analog to digital integrated circuit pins coupled to the first and second radio sections; and digital to analog integrated circuit pins coupled to the first and second radio sections.

8. The multimode wireless communication device of claim 1 comprises:

the analog to digital converter module, the digital to analog converter module, the digital baseband processing module, and the first radio section being in a first integrated circuit; and the second radio section being in a second integrated circuit.

9. The multimode wireless communication device of claim 8 wherein the first integrated circuit further comprises:

a control interface operably coupled to the second integrated circuit, wherein the control interface carries control signals to include the first or second mode of operation.

10. The multimode wireless communication device of claim 9, wherein the control interface comprises: a 4-wire Joint Test Action Group (JTAG) interface.

11. The multimode wireless communication device of claim 1 further comprises:
the analog to digital converter including an in-phase analog to digital converter and a quadrature analog to digital converter; and
the digital to analog converter including an in-phase digital to analog converter and a quadrature digital to analog converter.

12. The multimode wireless communication device of claim 1 further comprises:
the analog to digital converter converting in-phase inbound analog signals into in-phase inbound digital signals and converting quadrature inbound analog signals into quadrature inbound digital signals using alternating two-times oversampling; and
the digital to analog converter converting in-phase outbound digital signals into in-phase outbound analog signals and converting quadrature outbound digital signals into quadrature outbound analog signals using the alternating two-times oversampling.

13. The multimode wireless communication device of claim 1, wherein the digital baseband processing module comprises:
a first physical layer corresponding to the first mode of operation and to a third mode of operation;
a second physical layer corresponding to the second mode of operation;
physical layer coupling module operably coupled to the first and second physical layers to facilitate the third mode of operation; and
a Media-specific Access Control protocol (MAC) layer operably coupled to first physical layer, the second physical layer and to the physically layer coupling module to facilitate the first, second, and third modes of operation.

14. A multimode wireless communication device comprises:
a first integrated circuit that includes:
digital baseband processing module operably coupled to convert outbound data into outbound digital baseband signals and to convert inbound digital baseband signals into inbound data, wherein the digital baseband processing module includes:
a first physical layer corresponding to the first mode of operation and to a third mode of operation;
a second physical layer corresponding to the second mode of operation;
physical layer coupling module operably coupled to the first and second physical layers to facilitate the third mode of operation;
analog to digital converter module operably coupled to convert inbound analog baseband signals into the inbound digital baseband signals;
digital to analog converter module operably coupled to convert the outbound digital baseband signals into outbound analog baseband signals; and
first radio section operably coupled to convert the outbound analog baseband signals into first outbound radio frequency (RF) signals and to convert first inbound RF signals into the inbound analog baseband signals when the wireless communication device is in a first mode of operation; and
a second integrated circuit that includes a second radio section operably coupled to convert the outbound analog baseband signals into second outbound RF signals and to convert second inbound RF signals into the inbound analog baseband signals when the wireless communication device is in a second mode of operation.

15. The multimode wireless communication device of claim 14 further comprises:
a first antenna;
a second antenna;
a first diplexer operably coupled to the first antenna;
a second diplexer operably coupled to the second antenna;
a first transmit/receive (T/R) switch operably coupled to the first and second diplexers and to the first radio section, wherein, when the wireless communication device is in the first mode of operation, the first T/R switch provides the first inbound RF signals from a first selected antenna of the first and second antennas to the first radio section and provides the first outbound RF signals from the first radio section to the first selected antenna; and
a second T/R switch operably coupled to the first and second diplexers and to the second radio section, wherein, when the wireless communication device is in the second mode of operation, the second T/R switch provides the second inbound RF signals from a second selected antenna of the first and second antennas to the second radio section and provides the second outbound RF signals from the second radio section to the second selected antenna.

16. The multimode wireless communication device of claim 14, wherein the first integrated circuit further comprises:
a control interface operably coupled to the second integrated circuit, wherein the control interface carries control signals to include the first or second mode of operation.

17. The multimode wireless communication device of claim 14 further comprises:
the analog to digital converter including an in-phase analog to digital converter and a quadrature analog to digital converter; and
the digital to analog converter including an in-phase digital to analog converter and a quadrature digital to analog converter.

18. The multimode wireless communication device of claim 14 further comprises:
the analog to digital converter converting in-phase inbound analog signals into in-phase inbound digital signals and converting quadrature inbound analog signals into quadrature inbound digital signals using alternating two-times oversampling; and
the digital to analog converter converting in-phase outbound digital signals into in-phase outbound analog signals and converting quadrature outbound digital signals into quadrature outbound analog signals using the alternating two-times oversampling.

19. The multimode wireless communication device of claim 14, wherein the digital baseband processing module further includes:
a Media-specific Access Control-protocol (MAC) layer operably coupled to first physical layer, the second physical layer and to the physically layer coupling module to facilitate the first, second, and third modes of operation.

20. A multimode wireless communication device comprises:
a first integrated circuit that includes:
digital baseband processing module operably coupled to convert outbound data into outbound digital baseband signals and to convert inbound digital baseband signals into inbound data;
analog to digital converter module operably coupled to convert inbound analog baseband signals into the inbound digital baseband signals;
digital to analog converter module operably coupled to convert the outbound digital baseband signals into outbound analog baseband signals;
a second integrated circuit that includes a first radio section operably coupled to convert the outbound analog baseband signals into first outbound radio frequency (RF) signals and to convert first inbound RF signals into the inbound analog baseband signals when the wireless communication device is in a first mode of operation; and
a third integrated circuit that includes a second radio section operably coupled to convert the outbound analog baseband signals into second outbound RF signals and to convert second inbound RF signals into the inbound analog baseband signals when the wireless communication device is in a second mode of operation; and
a diversity antenna arrangement, that includes a first antenna, a second antenna, a first diplexer coupled to the first antenna, and a second diplexer coupled to the second antenna, that selectively couples the first radio section to one of the first antenna and the second antenna, and that selectively couples the second radio section to one of the first antenna and the second antenna a first transmit/receive (T/R) switch operably coupled to the first and second diplexers and to the first radio section, wherein, when the wireless communication device is in the first mode of operation, the first T/R switch provides the first inbound RF signals from a first selected antenna of the first and second antennas to the first radio section and provides the first outbound RF signals from the first radio section to the first selected antenna; and
a second T/R switch operably coupled to the first and second diplexers and to the second radio section, wherein, when the wireless communication device is in the second mode of operation, the second T/R switch provides the second inbound RF signals from a second selected antenna of the first and second antennas to the second radio section and provides the second outbound RF signals from the second radio section to the second selected antenna.

21. The multimode wireless communication device of claim 20, wherein the first integrated circuit further comprises:
a control interface operably coupled to the second and third integrated circuits, wherein the control interface carries control signals to include the first or second mode of operation.

22. The multimode wireless communication device of claim 20, wherein the first integrated circuit comprises:
first analog to digital integrated circuit pins coupled to the first radio section;
second analog to digital integrated circuit pins coupled to the second radio section, wherein the first analog to digital integrated circuit pins are operably coupled to the second analog to digital integrated circuit pins;
first digital to analog integrated circuit pins coupled to the first radio section; and
second digital to analog integrated circuit pins coupled to the second radio section, wherein the second digital to analog integrated circuit pins are operably coupled to the first digital to analog integrated circuit pins.

23. The multimode wireless communication device of claim 20, wherein the first integrated circuit comprises:
analog to digital integrated circuit pins coupled to the first and second radio sections; and
digital to analog integrated circuit pins coupled to the first and second radio sections.

24. The multimode wireless communication device of claim 20 further comprises:
the analog to digital converter including an in-phase analog to digital converter and a quadrature analog to digital converter; and
the digital to analog converter including an in-phase digital to analog converter and a quadrature digital to analog converter.

25. The multimode wireless communication device of claim 20 further comprises:
the analog to digital converter converting in-phase inbound analog signals into in-phase inbound digital signals and converting quadrature inbound analog signals into quadrature inbound digital signals using alternating two-times oversampling; and
the digital to analog converter converting in-phase outbound digital signals into in-phase outbound analog signals and converting quadrature outbound digital signals into quadrature outbound analog signals using the alternating two-times oversampling.

26. The multimode wireless communication device of claim 20, wherein the digital baseband processing module comprises:
a first physical layer corresponding to the first mode of operation and to a third mode of operation;
a second physical layer corresponding to the second mode of operation;
physical layer coupling module operably coupled to the first and second physical layers to facilitate the third mode of operation; and
a Media-specific Access Control-protocol (MAC) layer operably coupled to first physical layer, the second physical layer and to the physically layer coupling module to facilitate the first, second, and third modes of operation.

* * * * *